United States Patent
Weng et al.

(10) Patent No.: US 12,074,478 B2
(45) Date of Patent: Aug. 27, 2024

(54) PERMANENT-MAGNET MOTOR ROTOR, PERMANENT-MAGNET MOTOR AND METHOD FOR PROCESSING A PERMANENT-MAGNET MOTOR ROTOR

(71) Applicant: HENGDIAN GROUP DMEGC MAGNETICS CO., LTD, Jinhua (CN)

(72) Inventors: Fenghua Weng, Jinhua (CN); Xiangliang Wu, Jinhua (CN); Leyang Weng, Jinhua (CN)

(73) Assignee: HENGDIAN GROUP DMEGC MAGNETICS CO., LTD, Jinhua (CN)

( * ) Notice: Subject to any disclaimer, the term of this patent is extended or adjusted under 35 U.S.C. 154(b) by 0 days.

(21) Appl. No.: 17/759,979

(22) PCT Filed: Sep. 22, 2021

(86) PCT No.: PCT/CN2021/119514
§ 371 (c)(1),
(2) Date: Aug. 2, 2022

(87) PCT Pub. No.: WO2023/284110
PCT Pub. Date: Jan. 19, 2023

(65) Prior Publication Data
US 2024/0186853 A1    Jun. 6, 2024

(30) Foreign Application Priority Data
Jul. 14, 2021 (CN) .......................... 202110793521.7

(51) Int. Cl.
*H02K 1/278* (2022.01)
*H02K 1/30* (2006.01)
*H02K 15/03* (2006.01)

(52) U.S. Cl.
CPC ............... *H02K 1/30* (2013.01); *H02K 1/278* (2013.01); *H02K 15/03* (2013.01); *H02K 2213/03* (2013.01)

(58) Field of Classification Search
CPC ........ H02K 1/08; H02K 1/278–1/2783; H02K 2201/06
See application file for complete search history.

(56) References Cited

U.S. PATENT DOCUMENTS 7,084,540 B2 * 8/2006 Brahmavar ............ H02K 1/278
310/156.47

FOREIGN PATENT DOCUMENTS

| CN | 201022157 | 2/2008 |
| CN | 101572468 | 11/2009 |

(Continued)

OTHER PUBLICATIONS

Office Action for Chinese Patent Application No. 202110793521.7, mailed Mar. 25, 2022.

(Continued)

*Primary Examiner* — Ramon M Barrera
(74) *Attorney, Agent, or Firm* — Andrus Intellectual Property Law, LLP

(57) ABSTRACT

Provided are a permanent-magnet motor rotor, a permanent-magnet motor and a method for processing a permanent-magnet motor rotor, relating to the field of motor technology. The permanent-magnet motor rotor includes a rotatable shaft, a silicon steel sheet member and a plurality of magnetic tiles. The silicon steel sheet member is sleeved on the rotatable shaft. The plurality of magnetic tiles are secured around the silicon steel sheet member at intervals. Two circumferential ends of each of the plurality of magnetic tiles are inclined with respect to the axis of the each of the plurality of magnetic tiles and inclined in directions opposite (Continued)

to each other to form two beveled surfaces. Beveled surfaces, facing to each other, of two adjacent ones of the plurality of magnetic tiles are disposed in parallel.

20 Claims, 4 Drawing Sheets

(56) References Cited

FOREIGN PATENT DOCUMENTS

| | | |
|---|---|---|
| CN | 101902087 | 12/2010 |
| CN | 102025202 | 4/2011 |
| CN | 102035280 | 4/2011 |
| CN | 102255401 | 11/2011 |
| CN | 202395554 | 8/2012 |
| CN | 102810966 | 12/2012 |
| CN | 102868275 | 1/2013 |
| CN | 203674833 | 6/2014 |
| CN | 104158325 | 11/2014 |
| CN | 104158373 | 11/2014 |
| CN | 104734383 | 6/2015 |
| CN | 205377497 | 7/2016 |
| CN | 205565934 | 9/2016 |
| CN | 106165259 | 11/2016 |
| CN | 109217600 | 1/2019 |
| CN | 208571755 | 3/2019 |
| CN | 211239484 | 8/2020 |
| CN | 113381543 | 9/2021 |
| JP | 2004129486 | 4/2004 |
| KR | 20130095110 | 8/2013 |
| KR | 20170052963 | 5/2017 |

OTHER PUBLICATIONS

International Search Report for PCT Application No. PCT/CN2021/119514, mailed Mar. 4, 2022.

* cited by examiner

PERMANENT-MAGNET MOTOR ROTOR, PERMANENT-MAGNET MOTOR AND METHOD FOR PROCESSING A PERMANENT-MAGNET MOTOR ROTOR

This application is a U.S. National Stage Application of PCT Application Serial No. PCT/CN2021/119514, filed Sep. 22, 2021, which claims priority to Chinese Patent Application No. 202110793521.7 filed with the China National Intellectual Property Administration (CNIPA) on Jul. 14, 2021, both of which are incorporated herein by reference in their entireties.

TECHNICAL FIELD

The present application relates to the field of motor technology and, for example, a permanent-magnet motor rotor, a permanent-magnet motor and a method for processing a permanent-magnet motor rotor.

BACKGROUND

Permanent-magnet motors have been more and more applied in new energy electric vehicles because of the advantages of less heating, simple structure, small volume, lightweight and low noise. New energy electric vehicles require the permanent-magnet motors to operate with as little energy loss as possible to have strong torque at a low rotation speed to ensure that torque is started and support a higher endurance mileage.

Traditional permanent-magnet motors often use orthomorphic magnetic tiles (the length of a magnetic tile is perpendicular to the width of the magnetic tile, and the magnetic tile is in a rectangle shape when unfolded), so a sawtooth-shaped magnetic field distribution is formed during operation, and energy loss is rather large. To alleviate this problem, stator winding groups of permanent-magnet motors have been designed as inclined-groove structures currently to weaken the cogging effect, obtain a magnetic field distribution in the shape of sinusoidal or nearly sinusoidal waves and reduce energy loss. However, due to a complex technique and a long processing cycle of a winding, the whole production efficiency of permanent-magnet motors is relatively low, and the production cost is relatively high.

SUMMARY

The present application provides a permanent-magnet motor rotor, a permanent-magnet motor and a method for processing a permanent-magnet motor rotor. This method can not only effectively reduce operation energy loss, but also improve the whole production efficiency of permanent-magnet motor rotors and reduce the production cost.

The present application provides a permanent-magnet motor rotor. The permanent-magnet motor rotor includes a rotatable shaft, a silicon steel sheet member and a plurality of magnetic tiles. The silicon steel sheet member is sleeved on the rotatable shaft. The plurality of magnetic tiles are secured around the silicon steel sheet member at intervals. Two circumferential ends of each of the plurality of magnetic tiles are inclined with respect to an axis of the each of the plurality of magnetic tiles and inclined in directions opposite to each other to form two beveled surfaces, and beveled surfaces, facing to each other, of two adjacent ones of the plurality of magnetic tiles are disposed in parallel.

The present application further provides a permanent-magnet motor including the preceding permanent-magnet motor rotor.

The present application further provides a method for processing the permanent-magnet motor rotor that is applicable to the preceding permanent-magnet motor rotor. The method for processing the permanent-magnet motor rotor includes the steps below.

A silicon steel sheet member is sleeved on a rotatable shaft.

A plurality of magnetic tiles corresponding to a plurality of poles of a permanent-magnet motor are beveled such that two circumferential ends of each of the plurality of magnetic tiles are inclined with respect to an axis of the each of the plurality of magnetic tiles and inclined in directions opposite to each other to form beveled surfaces.

The plurality of magnetic tiles are secured around the silicon steel sheet member at intervals, and beveled surfaces, facing to each other, of two adjacent ones of the plurality of magnetic tiles are parallelized to form the permanent-magnet motor rotor.

REFERENCE LIST

Figure 1:
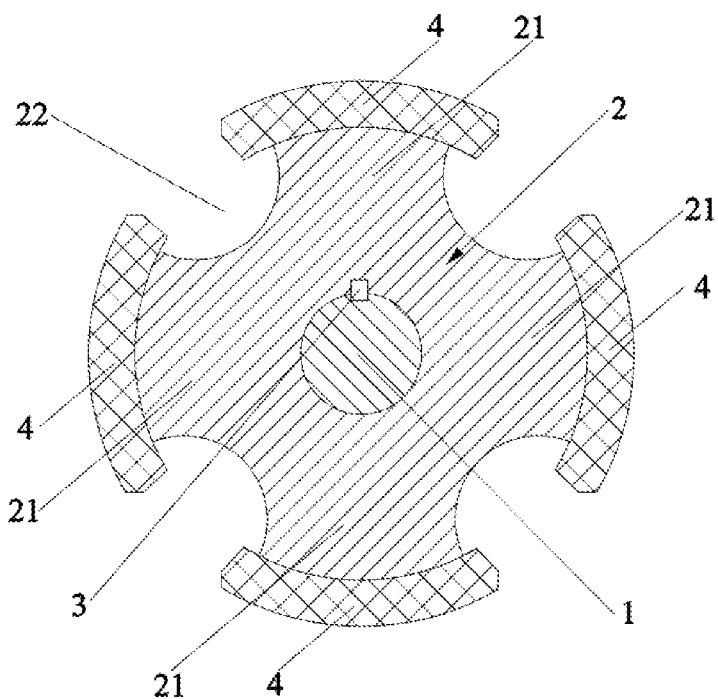
FIG. 1 is an overall sectional view illustrating the structure of a permanent-magnet motor rotor according to an embodiment of the present application.

1 rotation shaft
2 silicon steel sheet member
2 salient pole
22 groove
33 securing key
4 magnetic tile
41 beveled surface
42 axial large end face
43 axial small end face

DETAILED DESCRIPTION

The technical solutions of the present application are described hereinafter through specific embodiments in conjunction with the drawings.

In the description of the present application, unless otherwise expressly specified and limited, the terms "connected to each other", "connected" or "fixed" are to be construed in a broad sense, for example, as fixedly connected, detachably connected, or integrated; mechanically connected or electrically connected; directly connected to each other or indirectly connected to each other via an intermediary; or internally connected between two elements or interaction relations between two elements. For those of ordinary skill in the art, the above terms can be construed according to specific circumstances in the present application.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

In the description of the present application, it should be noted that the orientations or position relations indicated by terms such as "above", "below", "left", "right" and the like are based on orientations or position relations shown in the drawings. These orientations or position relations are intended only to facilitate and simplify description of the present application, and not to indicate or imply that a device or an element referred to must have such specific orientations or must be configured or operated in such specific orientations. Thus, these orientations or position relations are not to be construed as limiting the present application. In addition, the terms "first" and "second" are used only to distinguish between descriptions and have no special meaning.

Embodiment One

The present embodiment provides a permanent-magnet motor rotor. The permanent-magnet motor rotor includes a rotatable shaft 1, a silicon steel sheet member 2 and a plurality of magnetic tiles 4.

As shown in FIG. 1, the silicon steel sheet member 2 is sleeved on the rotatable shaft 1. For example, a shaft hole is disposed in the center of the silicon steel sheet member 2, and the silicon steel sheet member 2 is sleeved on the rotatable shaft 1 through the shaft hole. For example, two keyways are disposed inside the shaft hole and on the rotatable shaft 1 respectively. The securing keys 3 are disposed inside the keyways to enable the fixation between the silicon steel sheet member 2 and the rotatable shaft 1. The structure of the securing key 3 is conventional in the art and is not repeated here.

Figure 3:
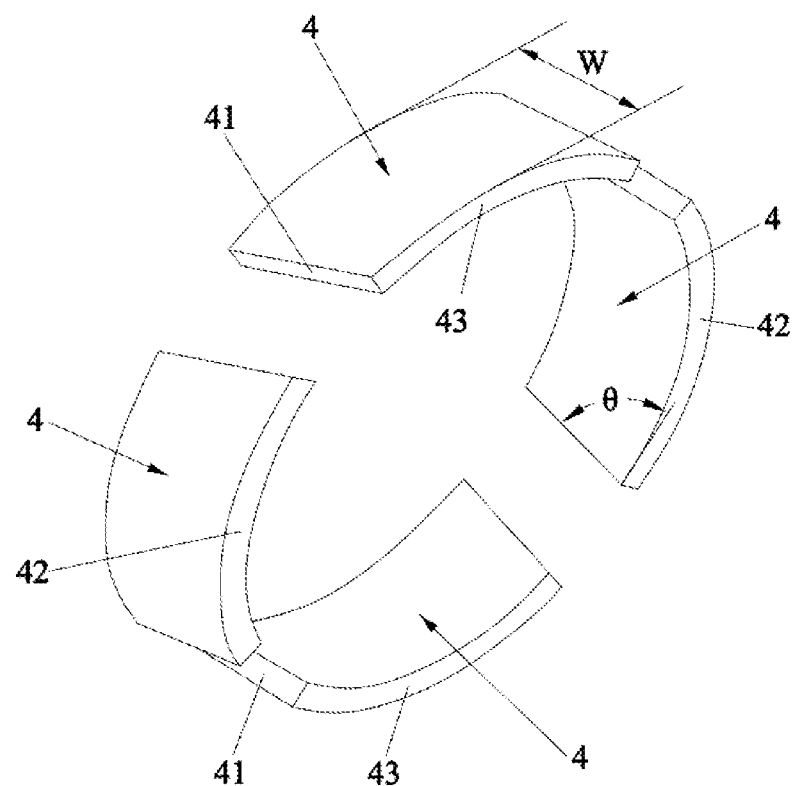
FIG. 3 is a view illustrating the overall arrangement of magnetic tiles in a permanent-magnet motor rotor according to an embodiment of the present application.

Referring to FIGS. 1 and 3, the plurality of magnetic tiles are secured around the silicon steel sheet member 2 at intervals (that is also around the permanent-magnet motor rotor). Two circumferential ends of each of the plurality of magnetic tiles 4 are inclined with respect to the axis of the each of the plurality of magnetic tiles 4 and inclined in directions opposite to each other to form two beveled surfaces 41. Moreover, beveled surfaces 41, facing to each other, of two adjacent ones of the plurality of magnetic tiles 4 are disposed in parallel.

Accordingly, after the two circumferential ends of the each of the plurality of magnetic tile 4 are beveled, oblique magnetic poles are generated, and certain angles are formed between the oblique magnetic poles and the stator windings so that the magnetic poles have asymmetry around the permanent-magnet motor rotor, thereby forming a sinusoidal or nearly sinusoidal magnetic field distribution, reducing the torque pulse, obtaining no axial overlap of adjacent magnetic poles and reducing the attenuation of torque density. Consequently, in operation, the permanent-magnet motor rotor may effectively reduce energy loss, make the maximum values of reluctance torque and permanent magnet torque superimposed at the same or similar current phase angle and still obtain strong torque at a low rotation speed to ensure that the starting torque is large enough.

From the point of view of manufacturing, when the permanent-magnet motor rotor is disposed, since only the magnetic tiles 4 need beveling, and the stator winding group does not need altering, the production technique may be effectively simplified, the production efficiency may be improved, and the production cost may be lowered.

In the present embodiment, the two circumferential ends of the each of the plurality of magnetic tiles 4 are inclined with respect to the axis of the each of the plurality of magnetic tiles 4 and inclined in directions opposite to each other to form oblique magnetic poles. It can be certainly said that the length direction of the each of the plurality of magnetic tiles 4 in the present embodiment is not perpendicular to the width direction of the each of the plurality of magnetic tiles 4. At the time, the each of the plurality of magnetic tiles 4 is in a trapezoidal shape when unfolded.

Figure 2:
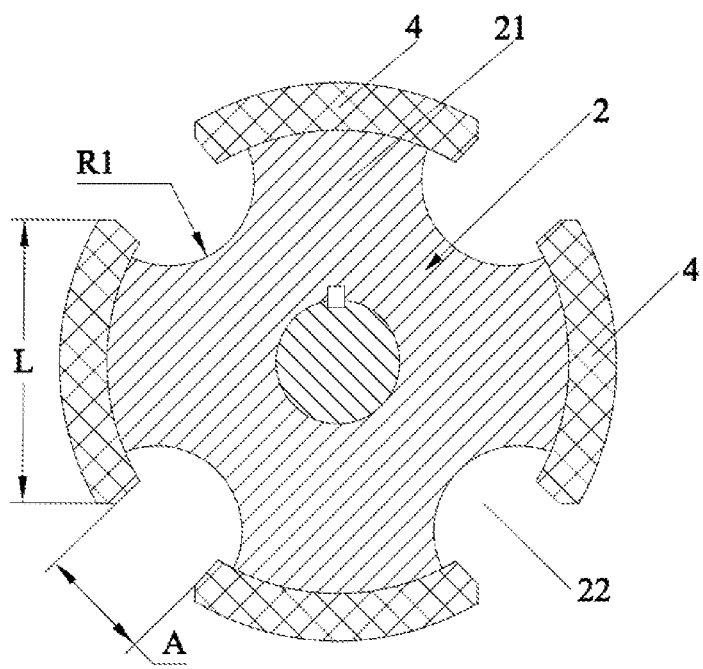
FIG. 2 is a view illustrating the dimensions of the permanent-magnet motor rotor of FIG. 1.

To more intuitively and more accurately describe this inclined configuration, referring to FIGS. 2 and 3, it is specified now that along the axis of the each of the plurality of magnetic tiles 4, an axial large end face 42 and an axial small end face 43 are formed at two axial ends of the each of the plurality of magnetic tiles 4, and the two end faces are both perpendicular to the axis of the each of the plurality of magnetic tiles 4. The area of the axial large end face 42 is greater than the area of the axial small end face 43. At the time, the included angle θ (denoted as beveled angle) formed between the axial large end face 42 and the beveled direction of each of the beveled surfaces 41 at the two circumferential ends of the each of the plurality of magnetic tiles 4 is an acute angle. For example, the material of magnetic tile 4 is not limited to such material as ferrite, neodymium iron boron, samarium cobalt, aluminum nickel and cobalt.

The configuration of the permanent-magnet motor rotor is described below.

As shown in FIG. 1, the silicon steel sheet member 2 includes a plurality of salient poles 21 disposed around the silicon steel sheet member 2. The plurality of magnetic tiles 4 are secured to the plurality of salient poles one to one to form obvious magnetic poles. In the present embodiment, the each of the plurality of magnetic tiles 4 is attached to one side of one salient pole that corresponds to the each of the plurality of magnetic tiles 4, where the one side of the one salient pole faces away from the axis of the silicon steel sheet member 2, and the each of the plurality of magnetic tiles 4 completely covers the one salient pole 21 corresponding to the each of the plurality of magnetic tiles 4.

As for the specific geometrical parameters, as shown in FIG. 2, when the each of the plurality of magnetic tiles 4 (or width of the each of the plurality of magnetic tiles 4) has the axial length W, W is greater than or equal to the axial length of the silicon steel sheet member 2 (or the thickness of the silicon steel sheet member 2). The gap A between two adjacent ones of the plurality of magnetic tiles 4 satisfies $0.5 \cdot W \cdot \cot \theta \leq A \leq W \cdot \cot \theta$.

Figure 4:
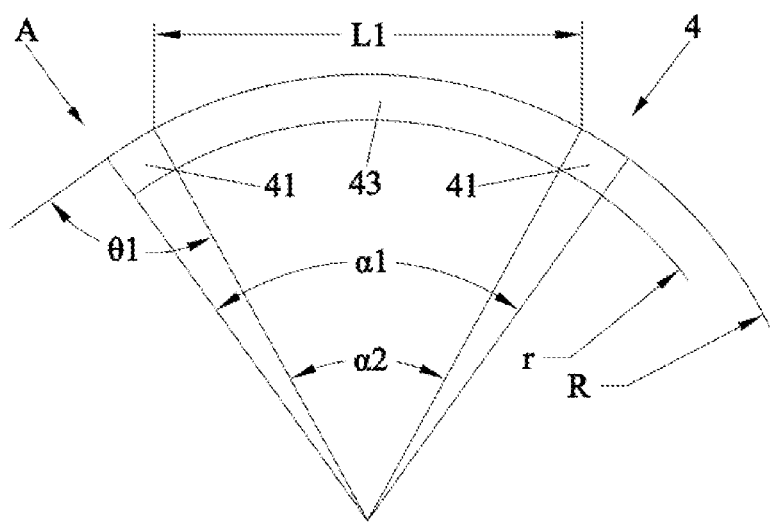
FIG. 4 is a view illustrating the axial orthographic projection structure of a magnetic tile.
Figure 5:
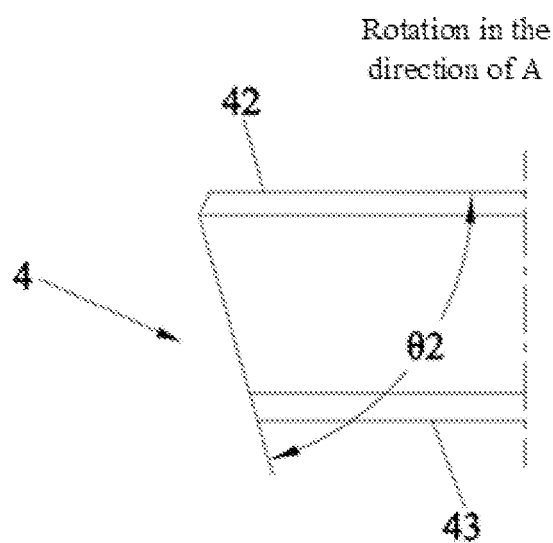
FIG. 5 is a view illustrating the structure rotatable in the direction of A of FIG. 4.

FIG. 4 is a projection of one of the plurality of magnetic tiles 4 on a plane perpendicular to the axis of the one of the plurality of magnetic tiles 4. The one of the plurality of magnetic tiles 4 has the outer diameter R and the inner diameter r. The central angle corresponding to the arced segment (denoted as the long arc) on the axial large end face 42 is α1, and the central angle corresponding to the arced segment (denoted as the short arc) on the axial small end face 43 is α2. The included angle formed between the long arc tangent and the short arc normal is θ1. With continued reference to FIG. 5, the included angle formed between the long arc tangent and the beveled direction of each of the beveled surfaces 41 and is θ2.

When the number of poles of a permanent-magnet motor is n, the largest arc length (that is the long arc length) of the each of the plurality of magnetic tiles 4 L=R·α1=(2πR−A)/n, and the short arc length of the each of the plurality of magnetic tiles 4 L1=(πr·α2)/180. In the present embodiment, the short arc length is the circumferential length of one magnetic tile 4 in contact with one salient pole 21 corresponding to the one magnetic tile 4.

For example, referring to FIGS. 1 and 2, in the permanent-magnet motor rotor, a groove 22 is disposed between two adjacent salient poles 21, and the groove 22 faces to a gap between two magnetic tiles 4 on the two adjacent salient poles 21 to generate a more nearly sinusoidally distributed magnetic field, reduce the structural temperature and improve the service life of the permanent-magnet motor rotor. Optionally, the groove 22 is an arced groove having the radius R1. This facilitates processing, reduces the stress concentration and improves service life.

Figure 6:
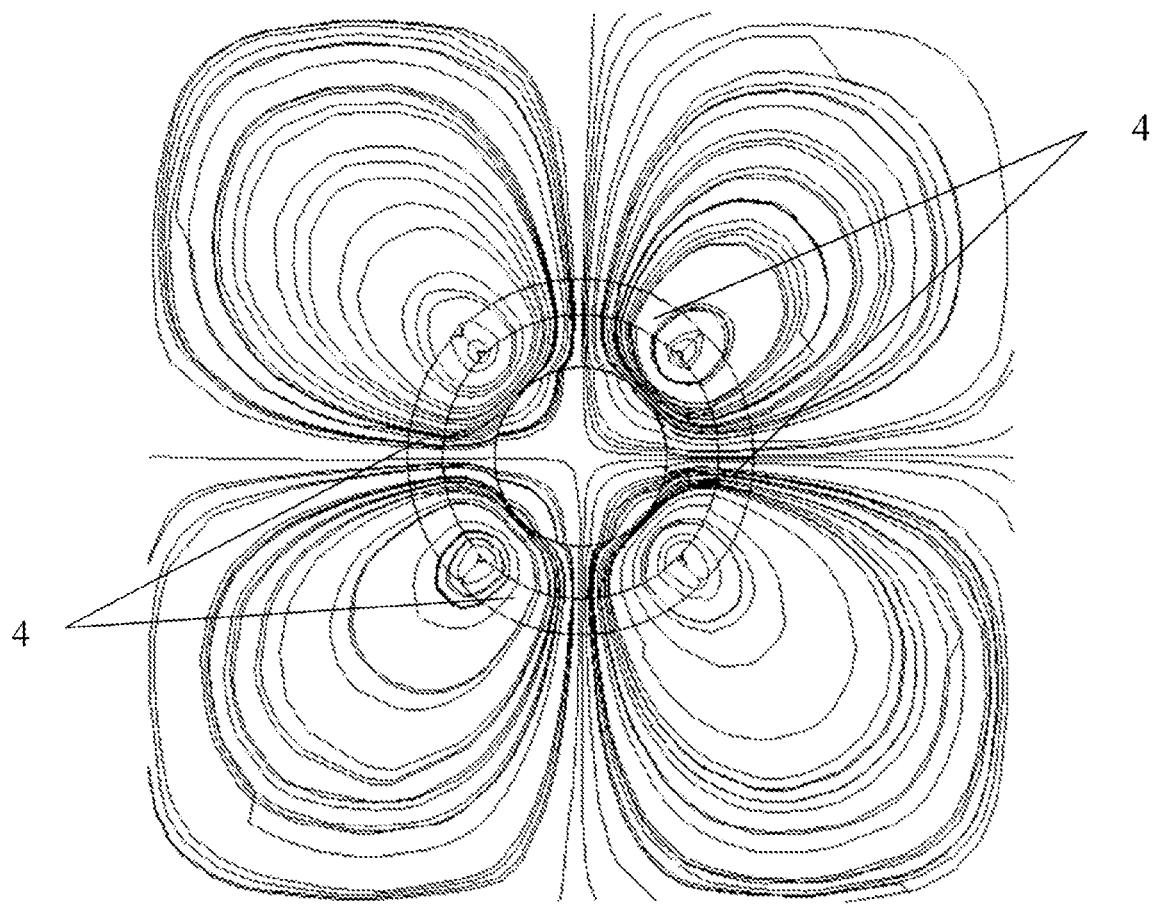
FIG. 6 is a view illustrating the magnetic field distribution generated by a permanent-magnet motor rotor in the related art.

Referring to FIG. 6, it corresponds to the configuration and magnetic distribution of a permanent-magnet motor rotor in the related art. In the permanent-magnet motor rotor shown in FIG. 2, adjacent rotor magnetic tiles 4 are abutted against each other, and no groove 22 is disposed on the silicon steel sheet member 2. At the time, as for any two adjacent rotor magnetic tiles 4, the more ineffective magnetic lines of force directly penetrating from adjacent end faces of rotor magnetic tiles 4, the more abnormal energy loss such as noise, and the larger the overall power consumption.

Figure 7:
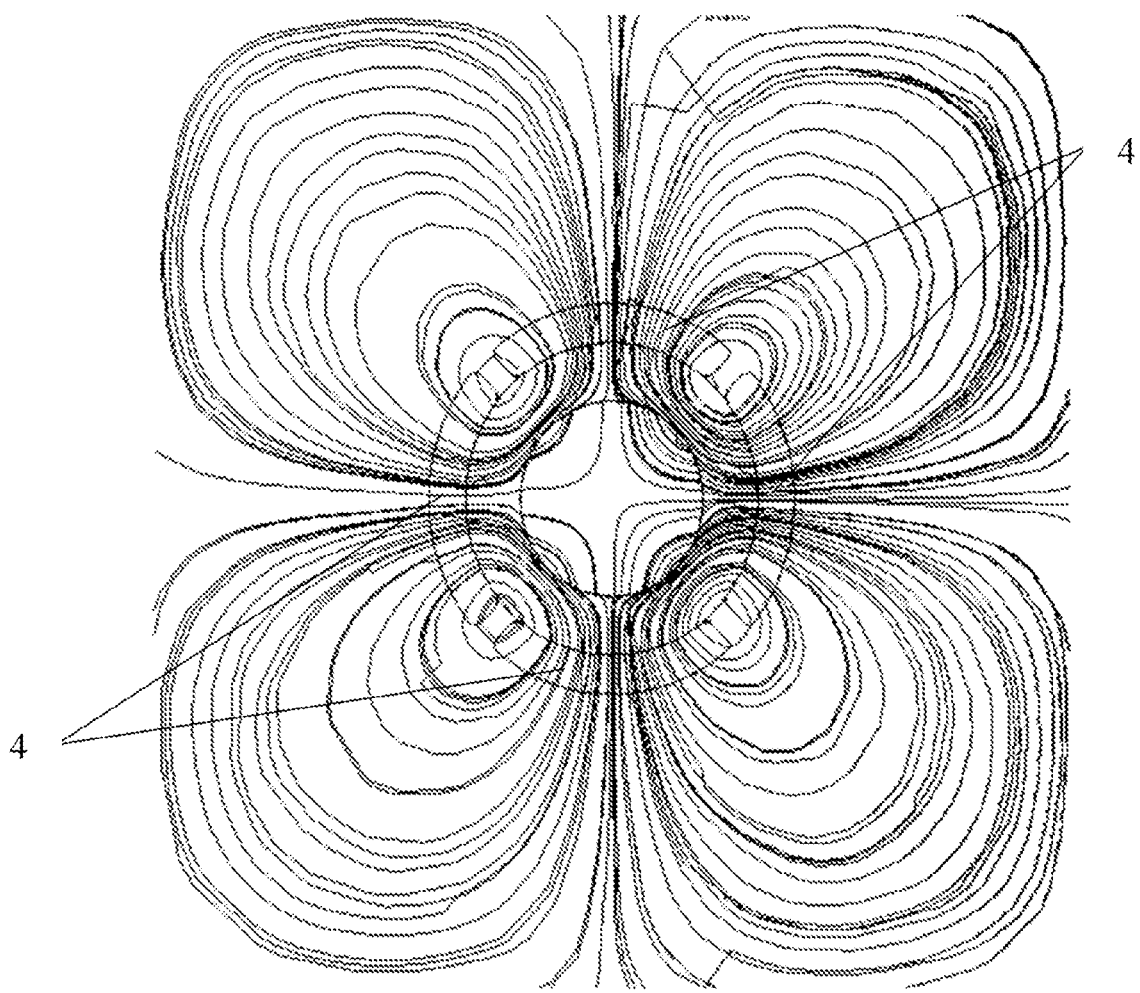
FIG. 7 is a view illustrating the magnetic field distribution generated by a permanent-magnet motor rotor according to an embodiment of the present application.

In contrast, FIG. 7 is the configuration and magnetic field distribution of a permanent-magnet motor rotor in the present embodiment. It can be seen that when a relatively large gap is left between adjacent magnetic tiles, and grooves 22 are disposed between salient poles 21, as for any two adjacent magnetic tiles 4, the ineffective magnetic lines of force directly penetrating from adjacent end faces of the magnetic tiles 4 are reduced, and the density of magnetic lines of force in the normal direction of adjacent parts of the magnetic tile 4 becomes sparse, but the density of magnetic lines of force in the middle of the magnetic tile 4 are increased. In this manner, the magnetic beams effectively acting on the stator are added, and, combined with the superimposition of magnet beveled technology, the asymmetric reluctance torque of magnetic circuit structure is strengthened, and the transition capacity and power density of the motor is improved. Consequently, the configuration can effectively improve the air-gap magnetic density waveform and obtain a more nearly sinusoidally distributed magnetic field, thereby reducing the abnormal energy loss and power consumption.

Moreover, during the rotation process of the permanent-magnet motor rotor, the interval configuration of magnetic tiles 4 and the design of groove 22 increase the air circulation inside the motor, more effectively diffusing the heat inside the motor, controlling the temperature rise of the motor, reducing the magnetism loss of the magnet when the motor operates, and lowering the requirements for temperature coefficient of the magnet and the production cost.

In the present embodiment, taking a 4-pole motor for example, the optional reference values of the preceding parameters are given as follows. A ranges from 2 mm to 4 mm, α1 ranges from 86° to 89°, α2 ranges from 68° to 75°, θ1 ranges from 75 to 85°, α2 ranges from 68 to 78°, and R1 ranges from 5 mm to 8 mm.

In view of this, the noise of the permanent-magnet motor is tested by use of two variables of the beveled angle θ and whether grooves 22 are disposed, and the results are obtained and shown in Table 1.

TABLE 1

| Beveled Angle θ (°) | Noise (dB) Of A Cylindrical Motor (No Groove Is Disposed On The Rotor) | Noise (dB) Of The Motor When Grooves Are Disposed On The Rotor |
| --- | --- | --- |
| 55 | 49 | 38 |
| 60 | 42 | 32 |
| 65 | 36 | 24 |
| 70 | 33 | 22 |
| 75 | 31 | 21 |
| 80 | 35 | 23 |
| 85 | 42 | 30 |
| 88 | 50 | 41 |
| Average | 39.75 | 28.875 |

As can be seen from Table 1: (1) when the beveled angle θ ranges from 65° to 80°, the noise reduction effect is more obvious; (2) the motor with grooves 22 disposed on the rotor can averagely reduce the noise by 10.875 dB compared with the motor without grooves 22 disposed on the rotor.

In addition, the load temperature rise of the motor is tested in the present embodiment with one variable of whether grooves 22 are disposed. During the test, a hole is disposed in the stator to measure the temperature. The results are shown in Table 2.

TABLE 2

| Time | 0 h | 1 h | 2 h | 3 h | 4 h | 5 h | 6 h | 7 h | 8 h | 10 h | 12 h | 16 h | Average |
| --- | --- | --- | --- | --- | --- | --- | --- | --- | --- | --- | --- | --- | --- |
| Temperature Of The Motor With Grooves (° C.) | 21.2 | 23.6 | 25.8 | 28.5 | 31.7 | 35.2 | 39.1 | 41.3 | 42.2 | 42.1 | 41.8 | 41.9 | 34.53 |
| Temperature Of The | | | | | | | | | | | | | |

TABLE 2-continued

| Time | 0 h | 1 h | 2 h | 3 h | 4 h | 5 h | 6 h | 7 h | 8 h | 10 h | 12 h | 16 h | Average |
|---|---|---|---|---|---|---|---|---|---|---|---|---|---|
| Motor Without Grooves (° C.) | 21.2 | 25.3 | 29.1 | 34.2 | 40.5 | 48.1 | 54.8 | 59.2 | 62.7 | 62.8 | 63.1 | 62.9 | 46.99 |

As can be seen from Table 2, under the same external environment conditions, when the grooves 22 are not disposed, the temperature of the motor rises by about 42° C., and the internal temperature of the stator reaches up to about 63° C. before stabilizing, and when the grooves 22 are disposed, the temperature of the motor rises by only about 21° C., and the internal temperature of the stator reaches only about 42° C. before stabilizing. It can be seen that the design of groove 22 is more conducive to prolonging the service life of the motor and improving the power conversion rate.

The present embodiment further provides a permanent-magnet motor including the preceding permanent-magnet motor rotor. For example, the permanent-magnet motor further includes a stator. The permanent-magnet motor rotor is coaxially disposed inside the stator. The structure of the stator is conventional in the art and thereby is not repeated here.

Overall, the present embodiment provides a permanent-magnet motor rotor and a permanent-magnet motor. The step-by-step transition problem of the magnetic field is solved through the scientific design and adjustment of the shapes and structures of magnetic tiles 4 and silicon steel sheet member 2. Thus, a sinusoidal or nearly sinusoidal rotor magnetic field can be obtained, the permanent-magnet motor can be ensured to still have large torque at a low rotation speed, the anti-electric magnetic field generated by the rotor magnetic field and the rotating stator can be avoided from resonating, and the technical problems such as the magnetism loss caused by the rapid temperature rise of the motor during a loading process can be solved.

Moreover, the permanent-magnet motor rotor is simple in processing, can improve the overall production efficiency of the permanent-magnet motor and can reduce the production cost.

Embodiment Two

The present embodiment provides a method for processing the permanent-magnet motor rotor. The steps are below.
  (1) The silicon steel sheet member 2 is sleeved on the rotatable shaft 1 such that the fixation between the silicon steel sheet member 2 and the rotatable shaft 1 is enabled through a securing key 3.
  (2) The plurality of magnetic tiles 4 corresponding to a plurality of poles of the permanent-magnet motor are beveled such that two circumferential ends of each of the plurality of magnetic tile 4 are inclined with respect to the axis of the each of the plurality of magnetic tiles 4 and inclined in directions opposite to each other to form beveled surfaces 41.

In practice, the processing process of traditional magnetic tiles is as follows: First, the width, length and bow height of a magnetic tile blank is ground. Then, automatic internal and external beveling and rough and fine grinding of internal and external circles are carried out. Last, ultrasonic cleaning and drying are carried out before the magnetic tile is finished. In contrast, when a magnetic tile 4 is processed in the present embodiment, only a beveling process is added between the rough and fine grinding of internal and external circles and ultrasonic cleaning. This method can achieve the same effect as the beveled groove winding and have the advantages of high efficiency, short processing period and low costs.
  (3) The plurality of magnetic tiles 4 are secured to the plurality of salient poles 21 one to one around the silicon steel sheet member 2, and the beveled surfaces 42, facing to each other, of two adjacent ones of the plurality of magnetic tiles 4 are parallelized to form the permanent-magnet motor rotor.

What is claimed is:

1. A permanent-magnet motor rotor, comprising:
   a rotatable shaft;
   a silicon steel sheet member sleeved on the rotatable shaft; and
   a plurality of magnetic tiles secured around the silicon steel sheet member at intervals, wherein two circumferential ends of each of the plurality of magnetic tiles are inclined with respect to an axis of the each of the plurality of magnetic tiles and inclined in directions opposite to each other to form two beveled surfaces, and beveled surfaces, facing to each other, of two adjacent ones of the plurality of magnetic tiles are disposed in parallel.

2. The permanent-magnet motor rotor according to claim 1, wherein the silicon steel sheet member comprises a plurality of salient poles disposed around the silicon steel sheet member, and the plurality of magnetic tiles are secured to the plurality of salient poles one to one.

3. The permanent-magnet motor rotor according to claim 2, wherein the each of the plurality of magnetic tiles is attached to one side of one salient pole that corresponds to the each of the plurality of magnetic tiles, wherein the one side of the one salient pole faces away from an axis of the silicon steel sheet member; and the each of the plurality of magnetic tiles completely covers the one salient pole corresponding to the each of the plurality of magnetic tiles.

4. The permanent-magnet motor rotor according to claim 2, wherein a groove is disposed between two adjacent ones of the plurality of salient poles, and the groove faces to a gap between two magnetic tiles on the two adjacent ones of the plurality of salient poles.

5. The permanent-magnet motor rotor according to claim 4, wherein the groove is an arced groove.

6. The permanent-magnet motor rotor according to claim 1, wherein an axial large end face and an axial small end face are formed at two ends of the each of the plurality of magnetic tiles in an axial direction of the each of the plurality of magnetic tiles, and the axial large end face and the axial small end face are both perpendicular to the axis of the each of the plurality of magnetic tiles, and an area of the axial large end face is greater than an area of the axial small end face; and
   an included angle θ formed between the axial large end face and a beveled direction of each of the two beveled surfaces ranges from 65° to 80°.

7. The permanent-magnet motor rotor according to claim 6, wherein the each of the plurality of magnetic tiles has an axial length W, and a value of a gap A between the two adjacent ones of the plurality of magnetic tiles satisfies $0.5 \cdot W \cdot \cot \theta \leq A \leq W \cdot \cot \theta$.

8. The permanent-magnet motor rotor according to claim 1, wherein the silicon steel sheet member is connected to the rotatable shaft through a securing key.

9. A permanent-magnet motor, comprising a permanent-magnet motor rotor, wherein the permanent-magnet motor rotor comprises:
a rotatable shaft;
a silicon steel sheet member sleeved on the rotatable shaft; and
a plurality of magnetic tiles secured around the silicon steel sheet member at intervals, wherein two circumferential ends of each of the plurality of magnetic tiles are inclined with respect to an axis of the each of the plurality of magnetic tiles and inclined in directions opposite to each other to form two beveled surfaces, and beveled surfaces, facing to each other, of two adjacent ones of the plurality of magnetic tiles are disposed in parallel.

10. A method for processing a permanent-magnet motor rotor, the method being applicable to a permanent-magnet motor rotor wherein the permanent-magnet motor rotor comprises:
a rotatable shaft;
a silicon steel sheet member sleeved on the rotatable shaft; and
a plurality of magnetic tiles secured around the silicon steel sheet member at intervals, wherein two circumferential ends of each of the plurality of magnetic tiles are inclined with respect to an axis of the each of the plurality of magnetic tiles and inclined in directions opposite to each other to form two beveled surfaces, and beveled surfaces, facing to each other, of two adjacent ones of the plurality of magnetic tiles are disposed in parallel, and
the method comprising:
sleeving a silicon steel sheet member on a rotatable shaft;
beveling a plurality of magnetic tiles corresponding to a plurality of poles of the permanent-magnet motor such that two circumferential ends of each of the plurality of magnetic tiles are inclined with respect to an axis of the each of the plurality of magnetic tiles and inclined in directions opposite to each other to form beveled surfaces; and
securing the plurality of magnetic tiles around the silicon steel sheet member at intervals and parallelizing beveled surfaces, facing to each other, of two adjacent ones of the plurality of magnetic tiles to form the permanent-magnet motor rotor.

11. The permanent-magnet motor according to claim 9, wherein the silicon steel sheet member comprises a plurality of salient poles disposed around the silicon steel sheet member, and the plurality of magnetic tiles are secured to the plurality of salient poles one to one.

12. The permanent-magnet motor according to claim 11, wherein the each of the plurality of magnetic tiles is attached to one side of one salient pole that corresponds to the each of the plurality of magnetic tiles, wherein the one side of the one salient pole faces away from an axis of the silicon steel sheet member; and the each of the plurality of magnetic tiles completely covers the one salient pole corresponding to the each of the plurality of magnetic tiles.

13. The permanent-magnet motor according to claim 11, wherein a groove is disposed between two adjacent ones of the plurality of salient poles, and the groove faces to a gap between two magnetic tiles on the two adjacent ones of the plurality of salient poles.

14. The permanent-magnet motor according to claim 13, wherein the groove is an arced groove.

15. The permanent-magnet motor rotor according to claim 9, wherein an axial large end face and an axial small end face are formed at two ends of the each of the plurality of magnetic tiles in an axial direction of the each of the plurality of magnetic tiles, and the axial large end face and the axial small end face are both perpendicular to the axis of the each of the plurality of magnetic tiles, and an area of the axial large end face is greater than an area of the axial small end face; and
an included angle θ formed between the axial large end face and a beveled direction of each of the two beveled surfaces ranges from 65° to 80°.

16. The method for processing the permanent-magnet motor rotor according to claim 10, wherein the silicon steel sheet member comprises a plurality of salient poles disposed around the silicon steel sheet member, and the plurality of magnetic tiles are secured to the plurality of salient poles one to one.

17. The method for processing the permanent-magnet motor rotor according to claim 16, wherein the each of the plurality of magnetic tiles is attached to one side of one salient pole that corresponds to the each of the plurality of magnetic tiles, wherein the one side of the one salient pole faces away from an axis of the silicon steel sheet member; and the each of the plurality of magnetic tiles completely covers the one salient pole corresponding to the each of the plurality of magnetic tiles.

18. The method for processing the permanent-magnet motor rotor according to claim 16, wherein a groove is disposed between two adjacent ones of the plurality of salient poles, and the groove faces to a gap between two magnetic tiles on the two adjacent ones of the plurality of salient poles.

19. The method for processing the permanent-magnet motor rotor according to claim 18, wherein the groove is an arced groove.

20. The method for processing the permanent-magnet motor rotor according to claim 10, wherein an axial large end face and an axial small end face are formed at two ends of the each of the plurality of magnetic tiles in an axial direction of the each of the plurality of magnetic tiles, and the axial large end face and the axial small end face are both perpendicular to the axis of the each of the plurality of magnetic tiles, and an area of the axial large end face is greater than an area of the axial small end face; and
an included angle θ formed between the axial large end face and a beveled direction of each of the two beveled surfaces ranges from 65° to 80°.

* * * * *